US006984048B2

(12) United States Patent  (10) Patent No.: US 6,984,048 B2
Yamabe  (45) Date of Patent: Jan. 10, 2006

(54) DOOR MIRROR

(75) Inventor: Hideyasu Yamabe, Osaka (JP)

(73) Assignee: Atras Auto Co., Ltd., Osaka (JP)

( * ) Notice: Subject to any disclaimer, the term of this patent is extended or adjusted under 35 U.S.C. 154(b) by 0 days.

(21) Appl. No.: 10/699,181

(22) Filed: Oct. 31, 2003

(65) Prior Publication Data

US 2004/0090689 A1    May 13, 2004

(30) Foreign Application Priority Data

Nov. 1, 2002    (JP) .............................. 2002-319405

(51) Int. Cl.
*G02B 7/182*    (2006.01)
*B60R 1/06*    (2006.01)
*B60R 1/08*    (2006.01)

(52) U.S. Cl. ...................... 359/841; 359/872; 359/877
(58) Field of Classification Search ................ 359/850, 359/851, 855, 865, 866, 874, 876, 841, 843, 359/872, 877
See application file for complete search history.

(56) References Cited

U.S. PATENT DOCUMENTS

| | | | | |
|---|---|---|---|---|
| 2,916,967 A | * | 12/1959 | Husak | 359/855 |
| 4,022,520 A | * | 5/1977 | Scifres | 359/855 |
| 4,498,738 A | | 2/1985 | Kumai | |
| 4,502,759 A | * | 3/1985 | Herzog et al. | 359/876 |
| 5,760,978 A | * | 6/1998 | Smith | 359/855 |
| 6,193,377 B1 | * | 2/2001 | Spigner | 359/602 |

| | | | |
|---|---|---|---|
| 2001/0012164 A1 | | 8/2001 | Englander |
| 2002/0015241 A1 | * | 2/2002 | Belaire ........................ 359/866 |

FOREIGN PATENT DOCUMENTS

| | | | | |
|---|---|---|---|---|
| DE | 3839322 | | | 5/1990 |
| GB | 2 200 609 A | * | | 8/1988 |
| GB | 2223724 A | * | | 4/1990 |
| JP | 08-058473 A | * | | 3/1996 |
| JP | 08-198010 A | * | | 8/1996 |
| JP | 09-301072 A | * | | 11/1997 |
| JP | 11-115631 A | * | | 4/1999 |
| JP | 2000-052862 A | * | | 2/2000 |
| JP | 2000-108786 A | * | | 4/2000 |
| JP | 2003-040037 A | * | | 2/2003 |
| WO | WO 03/011641 A1 | * | | 2/2003 |

OTHER PUBLICATIONS

"Correct Car Mirror Adjustment for YOUR Safety", Popular Science, p. 43, Dec. 1992.*

* cited by examiner

*Primary Examiner*—John Juba, Jr.
(74) *Attorney, Agent, or Firm*—D. Peter Hochberg; Sean Mellino; Katherine R. Vieyra

(57) ABSTRACT

A door mirror which is installed on a motor vehicle's body in such a manner as to project laterally from the vehicle's body so as to reflect on a surface of the mirror what is behind the vehicle's body, wherein the mirror surface of the door mirror is divided into□two parts, and thus divided mirror surfaces are respectively provided with reflection angle adjusting mechanisms so that reflection angles of the divided mirror surfaces can be independently and arbitrarily adjusted, and the divided mirror surface positioned on the outer side can be turned to project laterally from the door mirror to face outward.

10 Claims, 15 Drawing Sheets

DOOR MIRROR

FIELD OF THE INVENTION

This invention relates to a door mirror, in particular, to an improvement in a door mirror which is installed on the outside surface of a motor vehicle's door on each side of the driver's seat in such a manner as to project laterally relative to the vehicle's body so that it can reflect what is behind the vehicle's body.

BACKGROUND OF THE INVENTION

A door mirror for reflecting what is behind the vehicle's body is installed as a kind of safety device on the outside surface of a motor vehicle's door on each side of the driver's seat.

In general, however, there exists a driver's blind spot behind the vehicle's body, which is not reflected in the door mirror. When altering the reflection angle of the mirror so as to make such blind spot visible, an antinomic problem occurs of permitting a spot having been visible to become a blind spot. Accordingly, to make sure of the safety behind the vehicle's body with the door mirror, care must be taken of the above characteristic of the mirror. In addition, there has occurred another problem that when adjusting the reflection angle of the mirror so as to make visible what is in the distance behind the vehicle's body, it becomes difficult to view the rear wheel portion so as to prevent the vehicle from running onto the shoulder of a road due to the difference in distance from the shoulder between the front wheel and the rear wheel.

Further, when two vehicles pass each other on a narrow road or when a vehicle is put in a small garage, the door mirror is often folded so as to make the vehicle's width as small as possible; however, this also causes a problem in that once the door mirror is folded, what is behind the vehicle's body, that has been seen in the mirror until then, becomes completely invisible, making it difficult to make sure of the safety behind the vehicle's body.

Still further, when adjusting the reflection angle of the mirror so as to make visible what is in the distance behind the vehicle's body, as described above, it also becomes difficult to make sure of the safety around the rear wheels, causing a problem of permitting accidents, such as wheels' coming off, to be more likely to occur.

In order to overcome these problems, there have been proposed some types of door mirrors: for example, proposed in Japanese Unexamined Patent Publication No. 2000-272419 is a door mirror of which mirror surface has its outer portion convexly curved to broaden the driver's view so that the driver's blind spot is decreased as much as possible; and proposed in Japanese Unexamined Patent Publication No. 2000-108782 is a door mirror of which side surface has another mirror affixed thereon so that it can be used, when the door mirror is fold down, to see what is behind the vehicle's body and make sure of the safety there.

However, in the former invention, that is, the door mirror of which mirror surface has its outer portion convexly curved to broaden the driver's view, since the flat mirror surface, as a main portion, and the convexly curved mirror surface are continuously formed, the images reflected in the door mirror seem to the driver to change from a natural state at the main portion to a distorted state at the outer portion, which causes a problem of making the images less readable, and moreover, a problem of the driver's getting confused by the distortedly changing images and being unable to look carefully frontward.

Further, even with such a door mirror, the problem cannot be overcome of making invisible what is in the distance behind the vehicle's body when adjusting the reflection angle of the door mirror to make the rear wheels and their vicinities visible with an intention of preventing the rear wheels from running onto the shoulder of a road.

In the latter invention, that is, the door mirror of which side surface has another smaller mirror affixed thereon, when using the door mirror in the unfolded state, the smaller mirror affixed on its side surface is not only useless for making sure of the safety behind the vehicle's body, but liable to be an obstacle of other drivers' safe driving because it reflects in an unexpected direction the sunlight or headlamp lights of oncoming cars. Further, such a door mirror has another problem of being more likely to come in contact with some other things during the vehicle's moving, and once having come in contact with others, it is easily broken, as a result, it will never be able to be utilized again.

DISCLOSURE OF THE INVENTION

This invention is intended to solve the above mentioned problems, and has an object to develop a door mirror which can easily eliminate driver's blind spots produced beyond the limits of coverage by the door mirror during the vehicle's movement, and can permit a driver of the vehicle to easily make sure of the safety behind the vehicle's body even when the driver drives the vehicle backward with its door mirror folded down.

In order to accomplish the above object, the door mirror of this invention is such that it is installed on the outside surface of the door of a vehicle on each side of the driver's seat in such a manner as to project laterally from the door so that it can reflect what is behind the vehicle's body and its mirror surface is divided into two parts, each divided part of the mirror surface being provided with a reflection angle adjusting mechanism so that the reflection angle of each divided part is variable independently and arbitrarily.

Accordingly, by remote-controlling the reflection angle of each divided part of the mirror surface arbitrarily, a main reflected image is visible on one divided part while another image in the direction that the driver wants to observe, for example, an image of what is on the lateral side of the vehicle's body is visible on the other part of the mirror surface, leading to reduction in driver's blind spots or elimination of driver's blind spots.

The line that divides the mirror surface may be a horizontal line to divide the surface into the upper and lower parts, or a vertical line to divide the surface into the right and left parts.

In the former case, what is beneath and behind the vehicle's body is visible on the lower part of the divided mirror surface while what is in a distance behind the vehicle's body is visible on the upper part of the divided mirror surface. In the latter case, what is in a distance behind the vehicle's body is visible on the inner-side part of the divided mirror surface while what is in the vicinity of the lateral side of the vehicle's body is visible on the outer-side part of the divided mirror surface.

In the latter case, the outer-side part of the door mirror can be turned to project laterally so that the mirror surface thereof faces outward.

In this case, not only the reflection angle of the mirror surface can be adjusted to eliminate the driver's blind spots behind the vehicle's body, but also what is behind the vehicle's body can be observed on the outer-side part mirror surface of the door mirror that has been turned laterally to project outward, even when the door mirror is folded down. Thus, it becomes possible to make sure of the safety behind the vehicle's body.

The above door mirror may also be constructed in such a manner that the two divided parts of the mirror surface be supported by a common base of which reflection angle is variable to any desired angle by a first reflection angle adjusting mechanism, and the reflection angle of either one of the divided parts of the door mirror is adjustable independently by a second reflection angle adjusting mechanism provided on the common base.

Since the angles of the divided parts of the mirror surface are integrally adjustable as a whole, even if the mirror surface is divided into two parts, the divided mirror surfaces can be used as a single surface in a continuously connected state, whereas the angles of the divided parts of the mirror surface can be independently varied, thus rendering the door mirror to be highly adaptable.

DESCRIPTION OF THE EMBODIMENTS

In the following, embodiments of a door mirror of this invention will be described.

Embodiment 1

Figure 1:
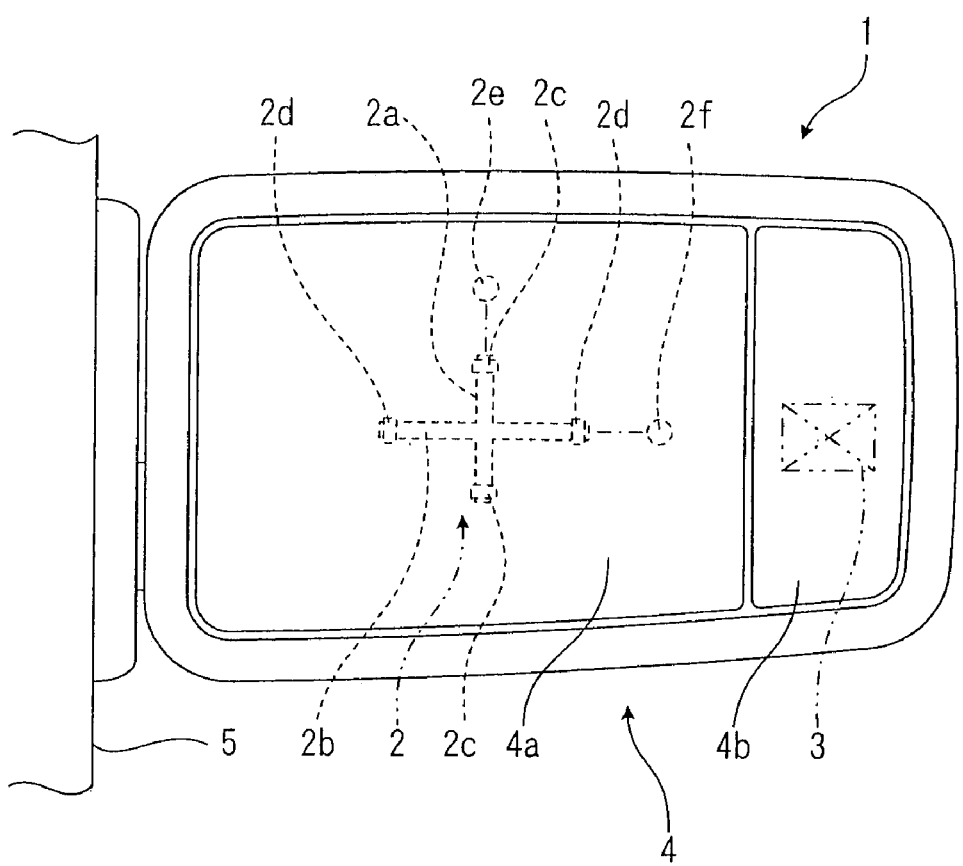
FIG. 1 is a front view of a door mirror in accordance with embodiment 1 of the invention.

In a door mirror 1 shown in FIG. 1, its mirror surface 4 for reflecting what is behind a vehicle's body is divided into two parts: an inner part which is nearer to the vehicle's body; and an outer part which is farther away from the vehicle's body, and reflection angles of the two divided mirror surfaces 4a, 4b can be arbitrarily changed respectively by reflection angle adjusting mechanisms 2, 3 mounted on the rear faces of the inner part and outer part divided mirror surfaces 4a, 4b, as shown by dotted lines in FIG. 1. The mechanisms for adjusting the reflection angles of the mirror surfaces are of the same types as the conventionally used ones, and their structures may be explained as follows. The reflection angle adjusting mechanism 2 includes a vertical shaft 2a and a horizontal shaft 2b intersecting crosswise in a cross shape. The vertical shaft 2a is supported by bearings 2c fixed to a casing 1c of the door mirror, while the horizontal shaft 2b is supported by bearings 2d fixed to the rear face of the mirror surface 4a. Each shaft is provided with a spring (not shown) and is urged to rotate in a fixed direction. Projections 2e, 2f are fixed to the inner face of the casing 1c, respectively at positions on virtually extended lines of the vertical shaft 2a and the horizontal shaft 2b intersecting crosswise to each other, the projections 2e, 2f being capable of protruding. When the projections 2e, 2f are caused to protrude against the urging forces of the springs while pushing the rear face of the mirror surface 4a, the reflection angle of the mirror surface 4a can be changed in a three-dimensional direction.

According to this door mirror 1, driver's blind spots that cannot be eliminated by one mirror surface 4a can be eliminated with the aid of the other mirror surface 4b if the reflection angles of the mirror surfaces 4a, 4b are independently adjusted by the reflection angle adjusting mechanisms 2, 3. Moreover, the reflection angles can be arbitrarily adjusted when a driver remote-controls the reflection angle adjusting mechanisms 2, 3 while observing the mirror surfaces 4a, 4b; thus, the use of the door mirror 1 makes it possible to eliminate much more of the driver's blind spots.

Figure 2:
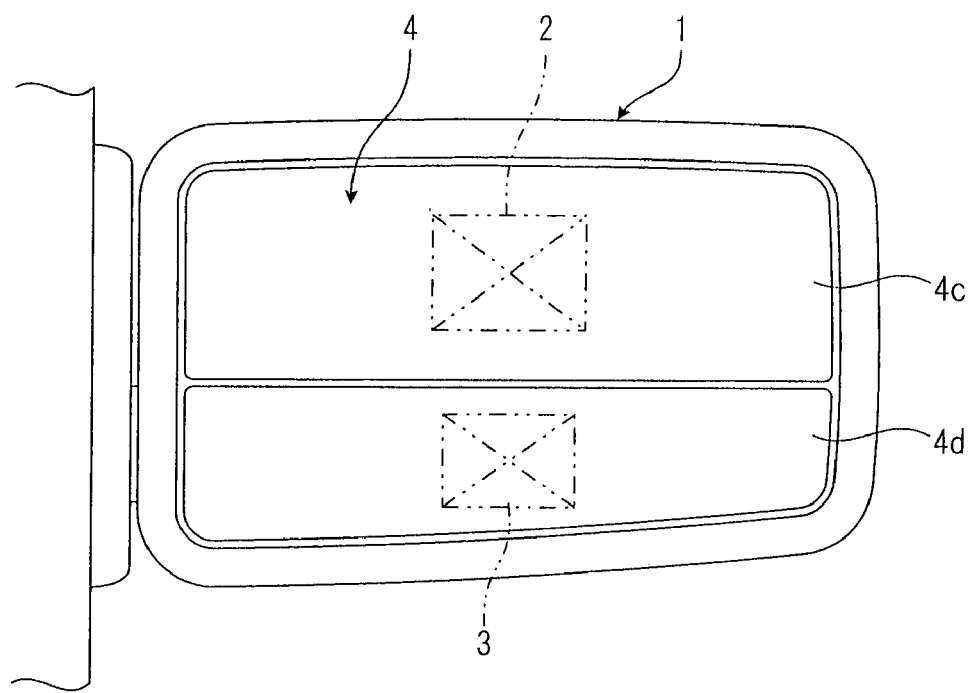
FIG. 2 is a front view of the door mirror in accordance with embodiment 1, showing another structural example.

In the above-mentioned embodiment, the mirror surface of a door mirror is divided into right-hand and left-hand parts, but the mirror surface of the door mirror may be divided into upper and lower parts, as shown in FIG. 2, such that the reflection angles of the divided mirror surfaces 4c, 4d are independently adjusted by reflection angle adjusting mechanisms 2, 3.

In this case, what is in the distance behind the vehicle's body is visible in the upper part of the divided mirror surface 4c while what is in the lower part behind the vehicle's body is visible in the lower part of the mirror surface 4d, so that the obstacles behind the vehicle's body can be observed regardless of the distance, which makes possible prevention of the vehicle's running over the shoulder of a road due to the difference in the distance from the shoulder between the front wheel and the rear wheel when driving forward and prevention of wheels' coming off when driving backward.

Further, the door mirror may be so designed that its mirror surface is composed of a combination of right-hand and left-hand divided mirror surfaces, as shown in FIG. 1, and upper and lower divided mirror surfaces, as shown in FIG. 2. For example, the mirror surface 4a shown in FIG. 1 is further divided into upper and lower mirror surfaces, and the reflection angles of thus divided mirror surfaces are made adjustable independently.

Figure 3:
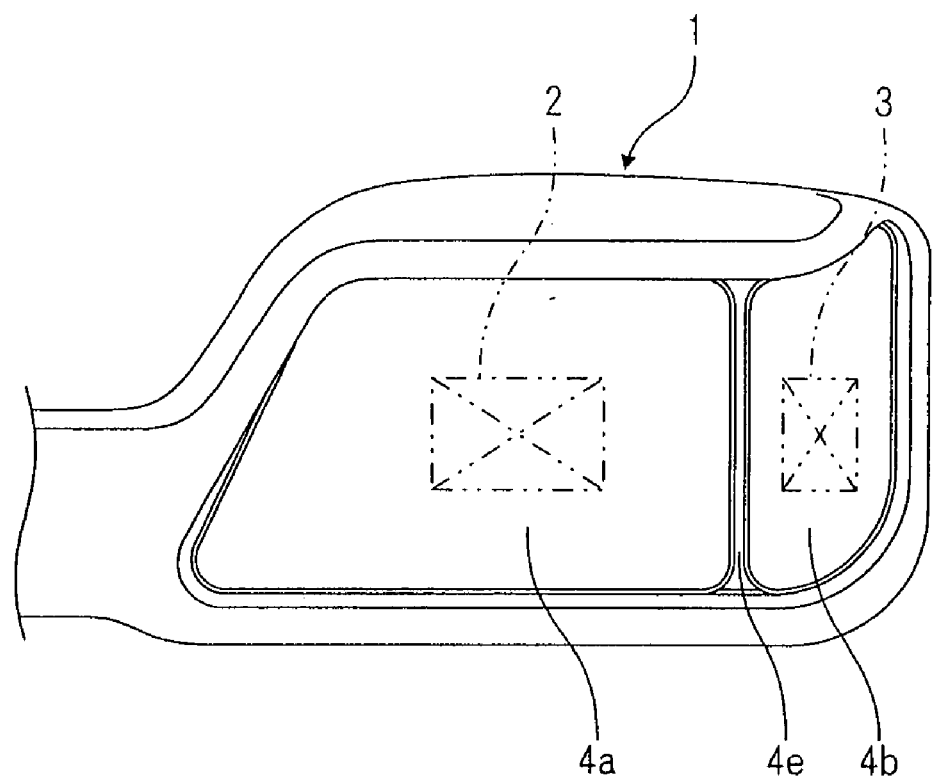
FIG. 3 is a perspective view of the door mirror in accordance with embodiment 1, showing still another structural example.

Further, the door mirror may be so designed that its mirror surface having an outer-side portion curved to face outward, as shown in FIG. 3, is divided into right-hand and left-hand two parts, and the reflection angles of thus divided mirror surfaces 4a, 4b are made adjustable independently.

In this case, the curved mirror surface is divided by a division line 4e into two parts visually clearly, which allows the driver to avoid getting confused by reflected images distortedly continuous from a flat surface to a curved surface.

As described above, according to this door mirror, the reflection angles of the respective divided mirror surfaces are arbitrarily adjusted, so that a driver's blind spot that cannot be covered by one part of the mirror surfaces can be can be covered by the other part of the mirror surfaces. Thus, what is distant behind the vehicle's body is reflected on the door mirror visibly more discernably.

Embodiment 2

Figure 4:
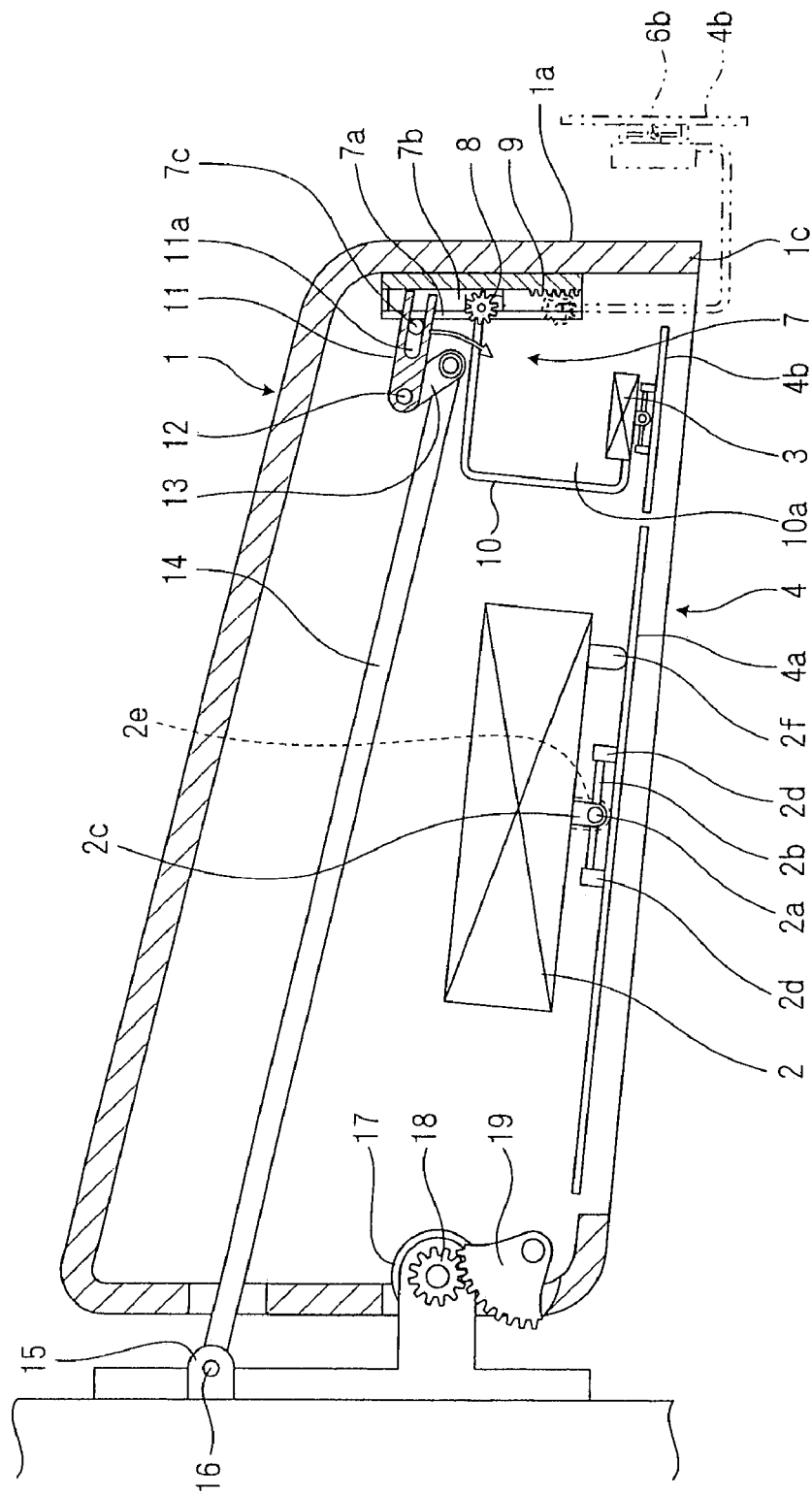
FIG. 4 is a sectional view of a door mirror in accordance with embodiment 2, illustrating a mechanism of the door mirror.
Figure 5:
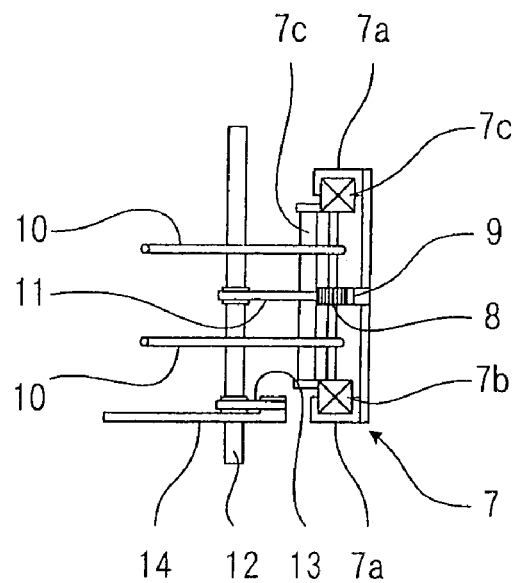
FIG. 5 is a front view of a main part of the door mirror in accordance with embodiment 2, illustrating the mechanism of the same.
Figure 6:
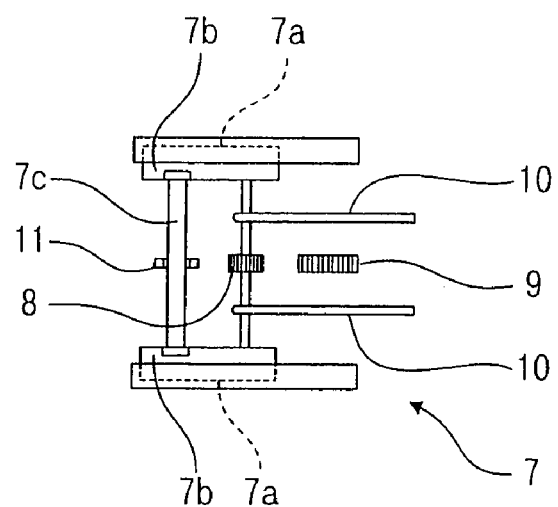
FIG. 6 is a side view of the main part of the door mirror in accordance with embodiment 2, illustrating the mechanism of the same.

The door mirror in accordance with embodiment 2, a cross section of which is shown in FIG. 4, is so designed that the reflection angles of the right-hand and left-hand divided mirror surfaces are arbitrarily adjustable by reflection angle adjusting mechanisms 2, 3, and the outer-side mirror surface 4b can be extended, integrally with the reflection angle adjusting mechanism 3, to project outward of a lateral face 1a of the door mirror 1 by a turning mechanism 7 including a slide link mechanism, as shown in FIGS. 5 and 6.

This turning mechanism 7 is co-axially supported by the shaft of a pinion 8 together with a guide rail 7a provided on the inside face of a casing 1c pendicularly to the mirror surface 4b, a slider 7b that slides along the guide rail 7a, the pinion 8 supported by a shaft perpendicular to the sliding direction of the slider 7b, and a rack 9 provided at the end of the stroke of the slider 7b. A turning arm 10 of which front portion is bent in a reversed J shape as shown in FIG. 4, a mirror surface 4b attached to a reversed-J-shaped tip portion of the turning arm 10 via the reflection angle adjusting mechanism 3 having the same structure as that of embodiment 1, and a crank arm 11 for slidably driving the slider 7b along the guide rail 7a, are pivotally supported by the rotating shaft 12 which is perpendicular to the sliding direction of the slider 7b. And a slotted groove 11a is engaged with a pin 7c provided to the slider 7b so as to slidingly move the slider 7b by the rotation of the crank arm 11. The rotating shaft 12 is operatively connected with a rod 14 and a crank 13 for rotationally moving the rotating shaft 12 according to the turning motion of the body of the rear-view mirror 1 and a rod 14, and the rod 14 is rotatably supported by a shaft 16 supported by a bearing 15 provided on a vehicle's body 5.

In FIG. 4, reference numeral 17 denotes a motor for driving the door mirror 1 to turn, and the shaft of the motor is provided with a gear 18 which drives a driven gear 19 on the door mirror side. When it is given a rotational motion by remote-controlling the motor 17, the door mirror 1 is allowed to be folded parallel to the vehicle's body or reversely unfolded.

The operation of this door mirror will be described.

During the vehicle's ordinary running, the door mirror is used to reflect what is behind the vehicle's body while adjusting the reflection angles of the divided mirror surfaces 4a, 4b by controlling the turning angle around the horizontal and vertical shafts.

When there arises a need to fold the door mirror, for example, when two vehicles pass each other on a narrow road or when a vehicle is moved into a small garage, the door mirror is folded by hand or by remote-controlling the motor 17.

At this point, once the door mirror 1 is turned in the direction in which it is folded, the relative spacing between the rotating shaft 12 and the supporting shaft 16 on the vehicle's body side is gradually widened, which allows the rod 14 to pull the crank 13, causing the shaft 12 to rotate, as a result, the slider 7b is pushed by the rotating crank arm 11 via the pin 7c and moved frontward of the mirror surface 4b.

Figure 7:
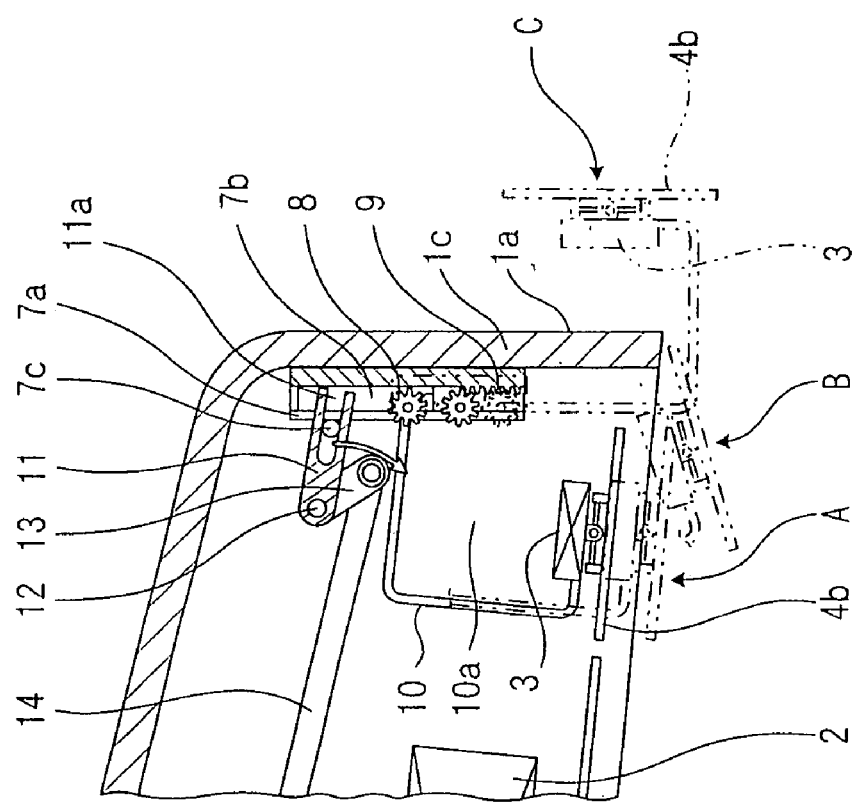
FIG. 7 is a sectional view of the main part of the door mirror in accordance with embodiment 2, illustrating an operation of the door mirror.

Since the slider 7b and the divided mirror surface 4b are connected by the turning arm 10, the divided mirror surface 4b is caused by the movement of the slider 7b to protrude frontward in a parallel manner to its mirror surface, as shown by the arrow A in FIG. 7.

When the divided mirror surface has protruded to a position where it can turn without causing a space 10a enclosed by the reverse-J-shaped arm 10 for giving a rotational motion, to interfere with the opening end of the casing 1c, the pinion 8 starts to engage with the rack 9 and rotate, causing the arm 10 to turn counterclockwise, as indicated by the arrow B in FIG. 7, and after the arm has turned to project the divided mirror surface 4b laterally outward, the divided mirror surface 4b stops with its surface facing outward, as indicated by the arrow C in FIG. 7.

The projected distance of the divided mirror surface 4b shown in FIG. 7 is adjusted according to the width of the space 10a enclosed in the turning arm 10.

At this point, the entire door mirror 1 has been folded down parallel to the lateral-side face of the vehicle's body, while the mirror surface 4b has been projected laterally outward of the door mirror 1, in other words, projected to a position where it can reflect what is behind the vehicle's body. Thus, even when the door mirror 1 is folded down, the driver can make sure of the safety behind the vehicle's body.

Furthermore, since the divided mirror surface 4b is attached to the turning arm 10 via the reflection angle adjusting mechanism 3, even after it is turned to project outward of the lateral face of the door mirror 1, its reflection angle can be adjusted.

When the folded door mirror 1 is unfolded again, contrary to the above described operation, with the rotational motion of the shaft 12 caused by the pushing motion of the rod 14, the slider 7b is pulled by the crank arm 11 and driven in the direction in which it is restored to its original position, and with this motion of the slider 7b, the pinion 8 engaging with the rack 9 starts to rotate, causing the arm 10 to turn in the direction of restoring its original position, and then with the movement of the slider 7b toward its original position, the divided mirror surface 4b is moved in parallel to its own surface to be accommodated in the casing 1c and finally allowed to be in the same plane as the original divided mirror surface 4a. In this state, the reflection angles of the divided mirror surfaces are adjusted, if necessary.

Thus, according to the door mirror of the embodiment 2, since the reflection angles of the divided mirror surfaces 4a, 4b can be arbitrarily adjusted, the effect obtained is that the driver's blind spots that have been unable to be eliminated by one mirror surface can be eliminated by the provision of the other mirror surface. Moreover, when folding down the door mirror 1 parallel to the lateral-side face of the vehicle's body, since the divided mirror surface 4b is automatically unfolded and projected laterally outward of the door mirror 1 along with the folding operation of the door mirror, such an effect can be obtained that the driver can make sure of the safety behind the vehicle's body even when the door mirror 1 is folded down.

Figure 8:
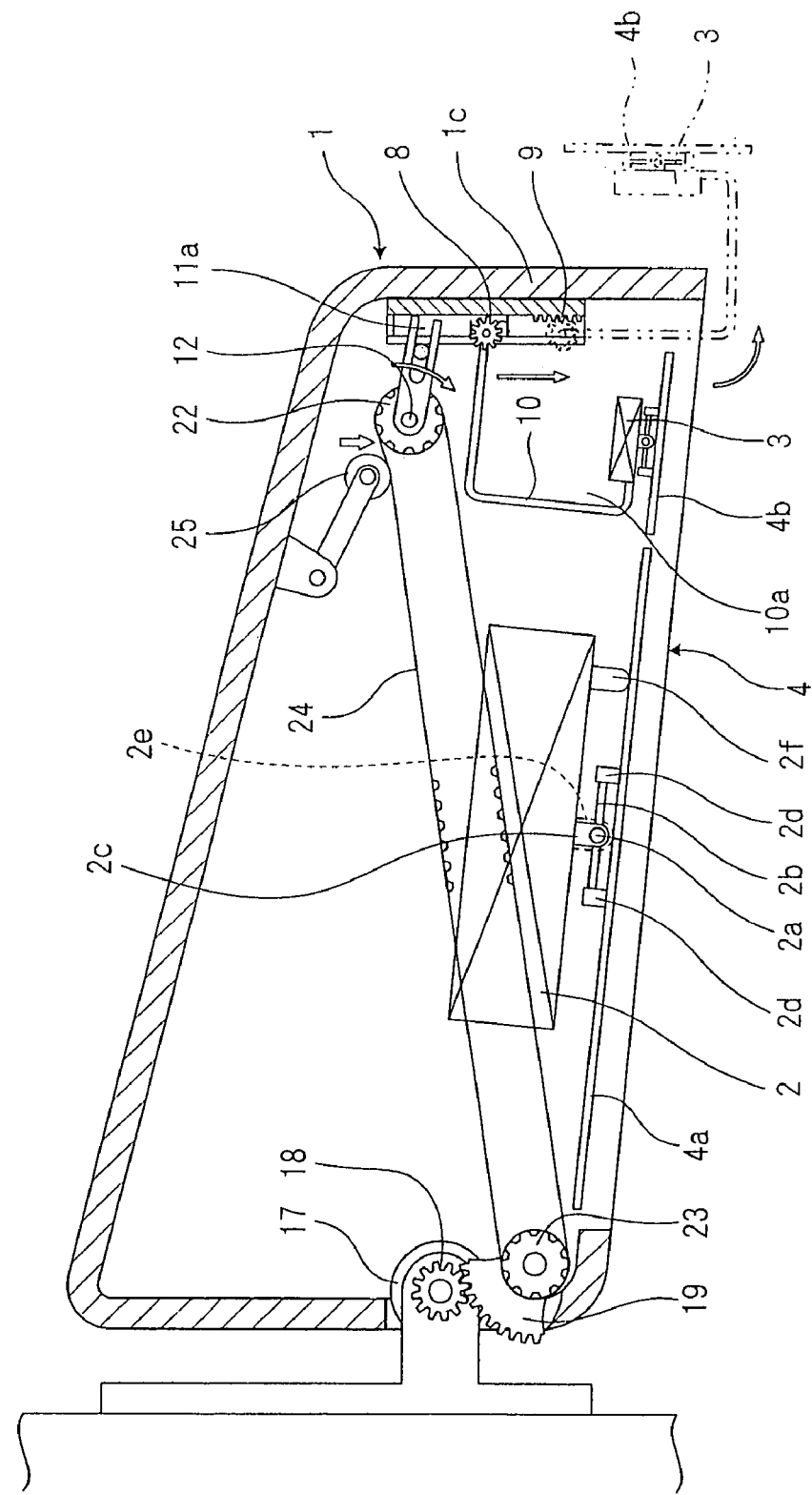
FIG. 8 is a sectional view of the door mirror in accordance with embodiment 2, showing another structural example.

While the door mirror 1 of embodiment 2 has been described taking an example in which the divided mirror surface 4b is protruded with the aid of a link mechanism, the divided mirror 1 may also be unfolded or folded by providing a shaft 12 and a gear rotating shaft 19 with pulleys 22, 23, respectively, and winding a power transmission belt 24 around the pulleys, as shown in FIG. 8, so that the rotational motion to unfold or fold the door mirror is transmitted to the shaft 12 through the belt. Reference numeral 25 in FIG. 8 denotes an idler which is used to press the belt 24 as shown by the arrow.

This embodiment is the same as that shown in FIG. 4 except that the pulleys 22, 23 and the power transmission belt 24 are used instead of the rod 14, the crank 13, and the shaft 16. Therefore, the same parts are denoted with the same reference numerals and the detailed description will be omitted.

Figure 9:
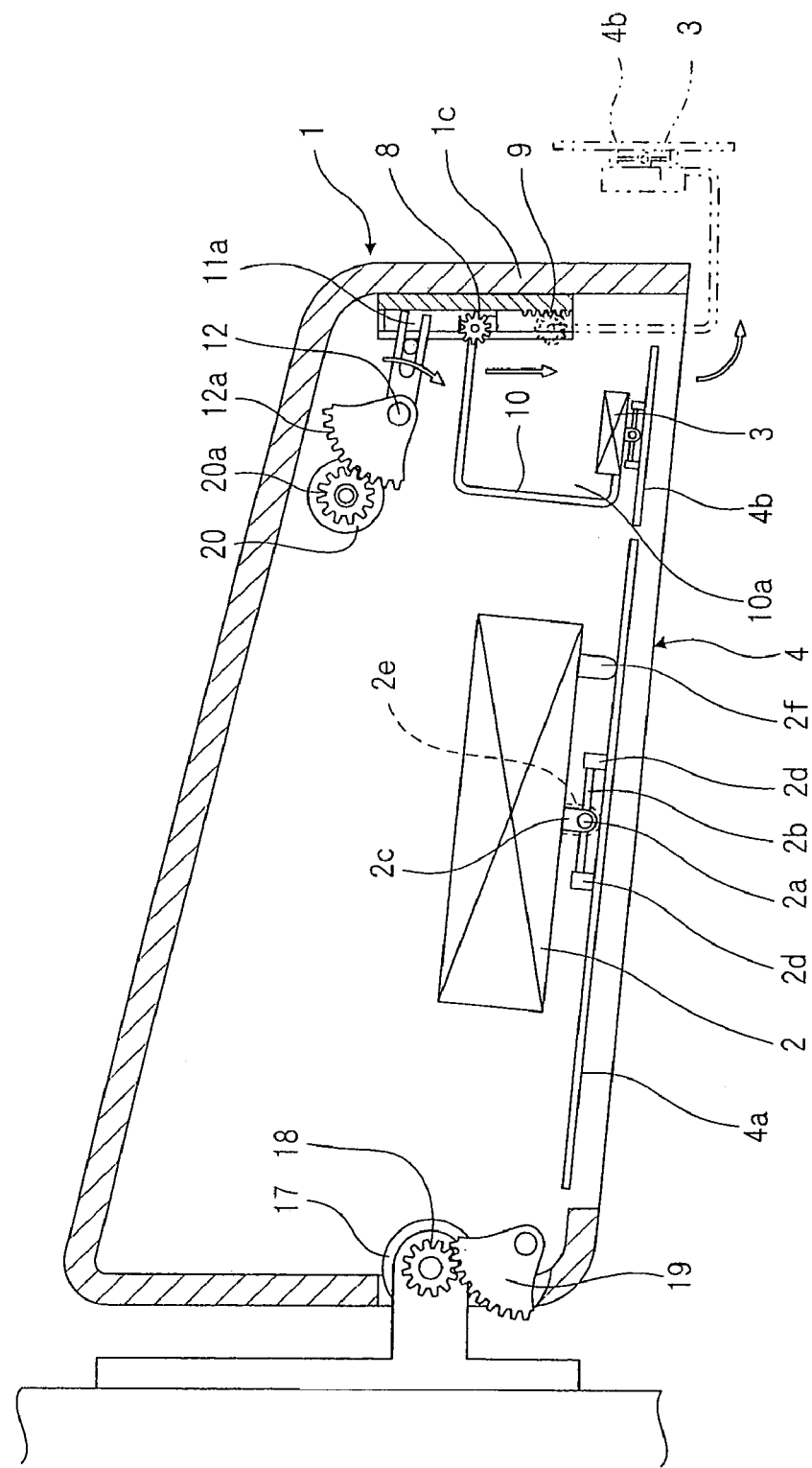
FIG. 9 is a sectional view of the door mirror in accordance with embodiment 2, showing still another structural example.

Alternatively, as shown in FIG. 9, the divided mirror surface 4b may be rotated and projected via gears 20a, 12a as shown by an arrow in the same figure by providing a driving motor 20 for the rotating shaft 12 and actuating the driving motor 20 by remote-controlling.

This embodiment is the same as that shown in FIG. 4 except that the driving motor 20 is provided instead of the rod 14, the crank 13, and the shaft 16. Therefore, the same parts are denoted with the same reference numerals and the detailed description will be omitted.

Embodiment 3

In the door mirror 1 in accordance with embodiment 3, the reflection angles of its divided mirror surfaces 4a, 4b are made adjustable by reflection angle adjusting mechanisms 2, 3 having the same structure as those of embodiment 1 and the divided mirror surface 4b on the outer side, together with the outer side face 1d of the casing 1c, can be turned to project from the casing 1c laterally outward of the outer side face of the door mirror 1.

In other words, the divided mirror surface 4b of the door mirror 1 in accordance with the embodiment 3 is attached to a curved arm 10b extended from the shaft 12 toward the outer periphery via the reflection angle adjusting mechanism 3, and its outside portion is integrated with a side face member 1d that forms the side face portion of the door mirror 1.

Figure 10:
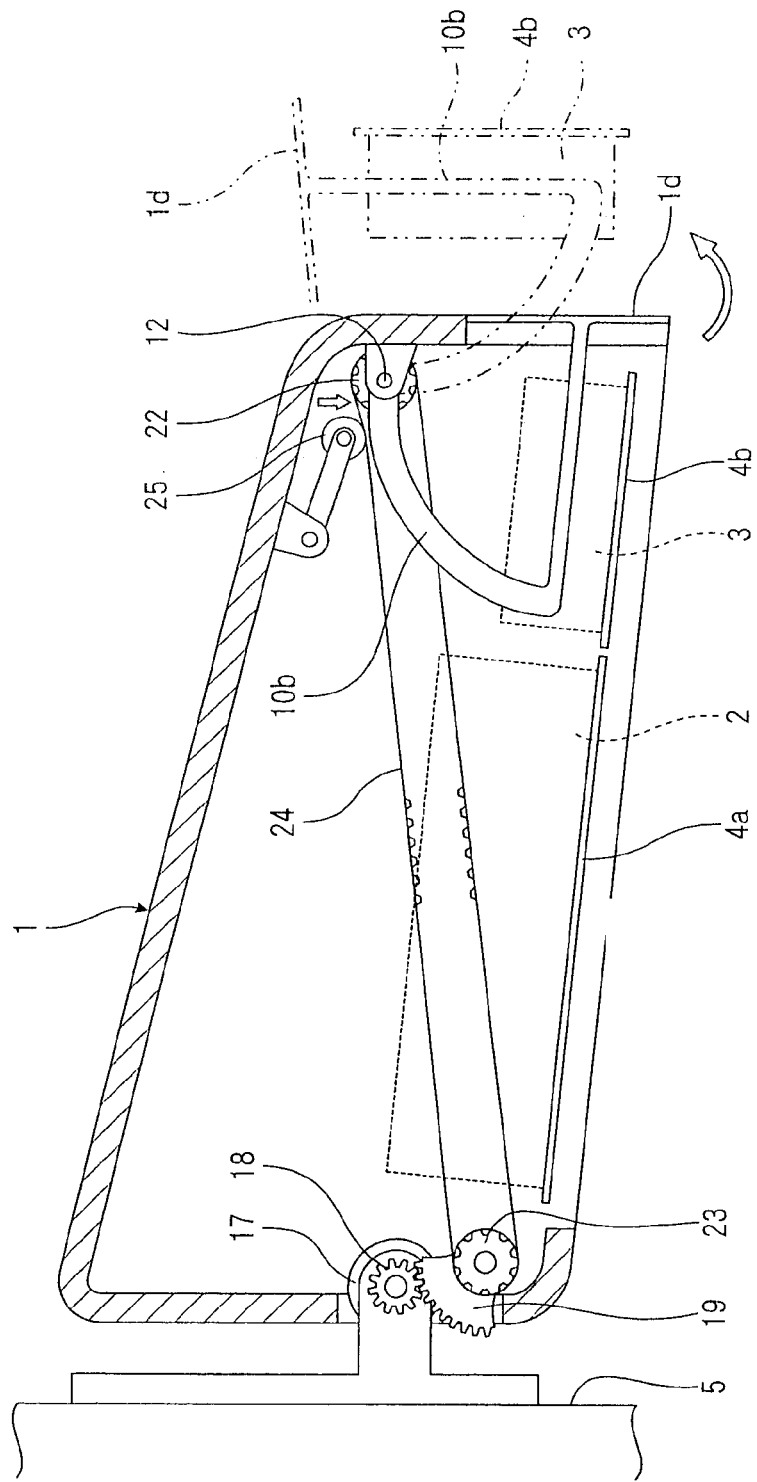
FIG. 10 is a sectional view of a door mirror in accordance with embodiment 3.

The shaft 12 is provided with the pulley 22 and the gear rotating shaft 19 of the door mirror 1 is coaxially provided with the pulley 23, the power transmission belt 24 is wound around the pulley 22, 23, and the divided mirror surface 4b is turned outward with the turning motion of the door mirror 1, as shown by hypothetical lines in FIG. 10. Reference numeral 25 in the same figure denotes an idler which is used to press the belt 24 as shown by an arrow.

Figure 12:
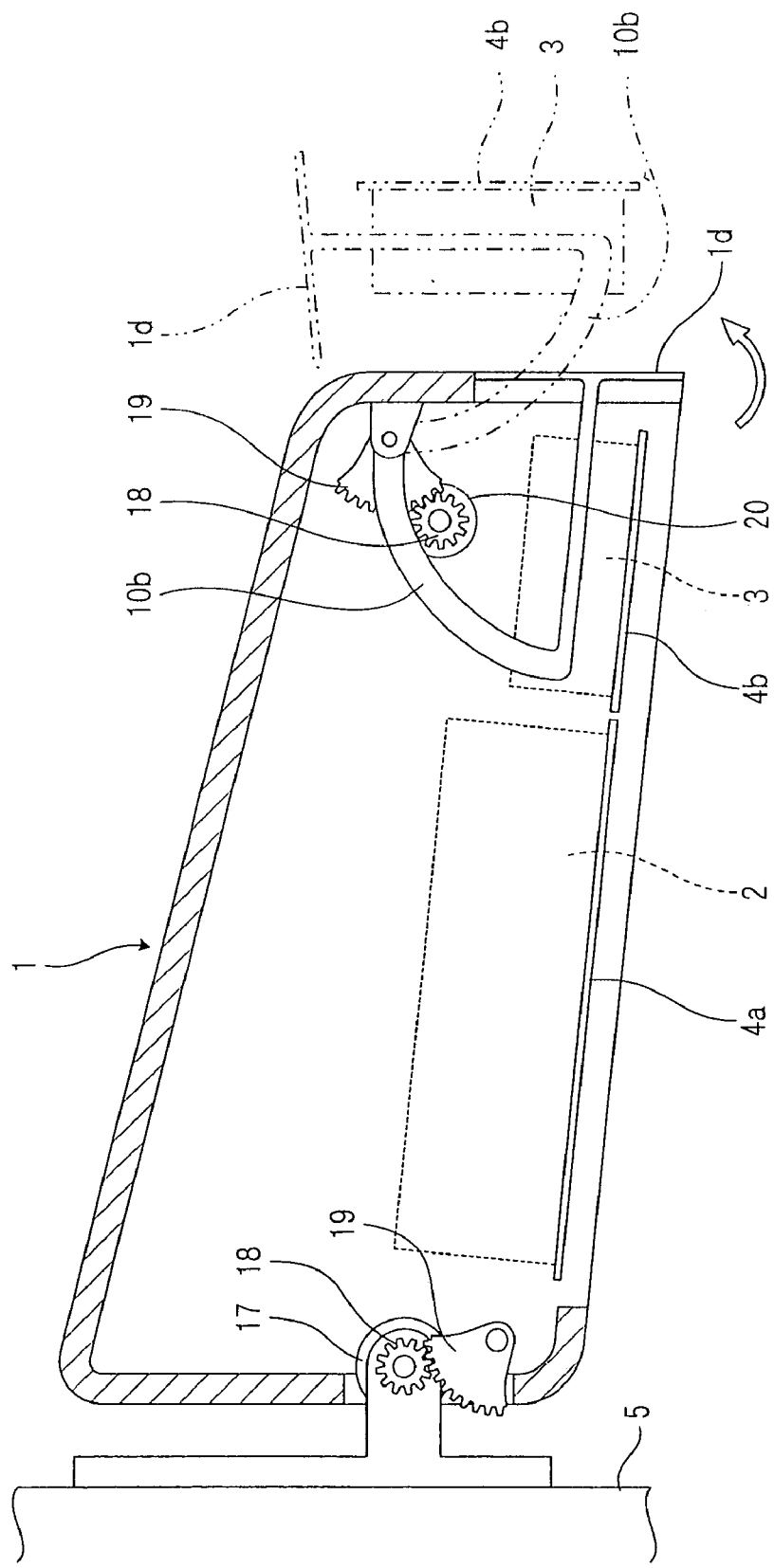
FIG. 12 is a sectional view of the door mirror in accordance with embodiment 3, showing another structural example.
Figure 13:
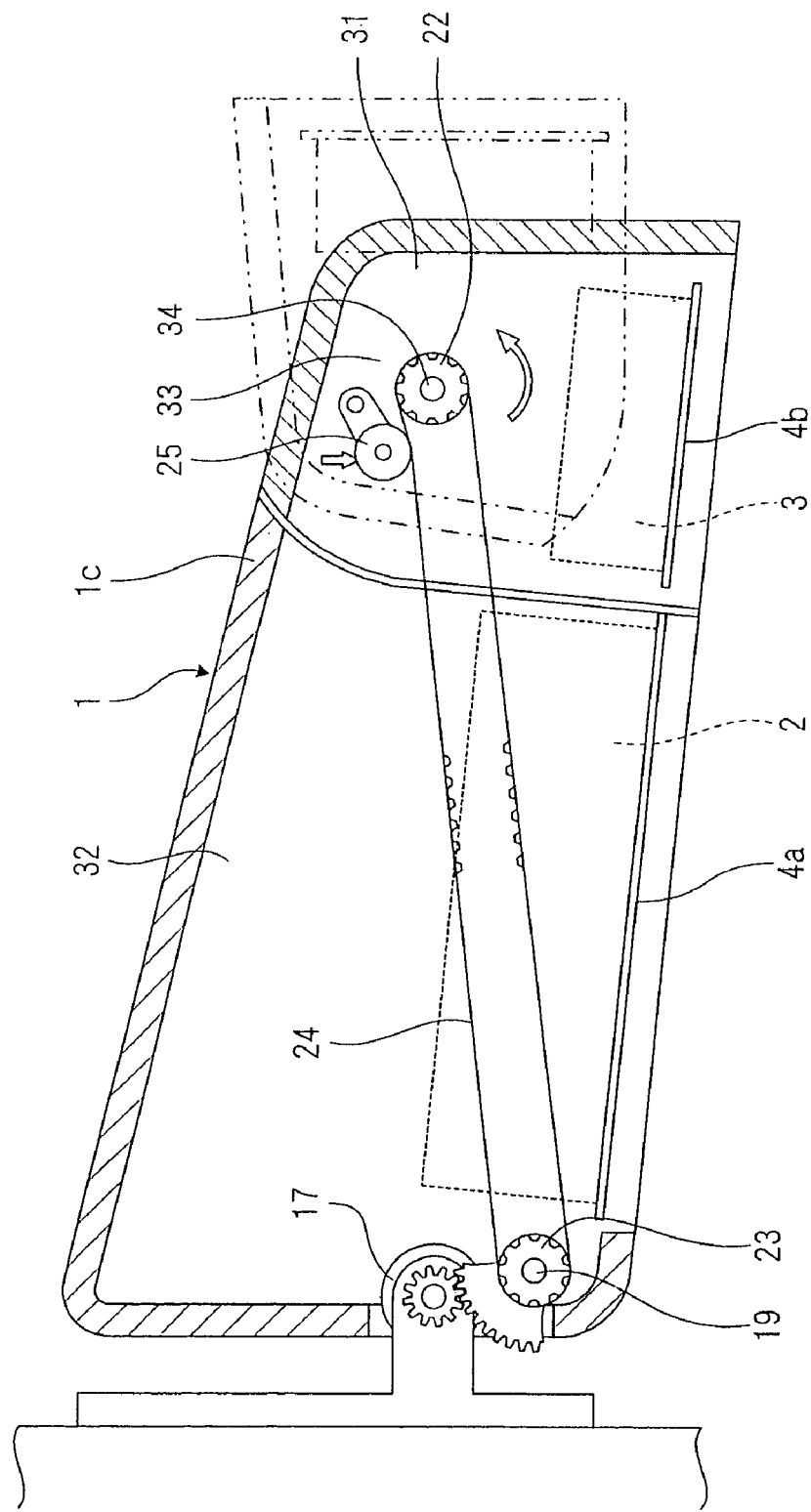
FIG. 13 is a sectional view of a door mirror in accordance with embodiment 4.

In this embodiment, too, the rotating shafts may be provided with motor 17, 20, as shown in FIG. 12. The door mirror shown in FIG. 13 is the same as that shown in FIG. 10 except that none of the power transmission belt 24 and the pulleys 22, 23 are used. Therefore, the same parts are denoted with the same reference numerals and the detailed description will be omitted.

Although the illustration is omitted, the shaft 12 may be rotationally driven by a rod and a crank which are connected to the vehicle's body.

The door mirror of the embodiment 3 has such an advantage that its mechanism for projecting the divided mirror surface 4b laterally outward of the body of the door mirror 1 is easier and simpler as compared with that of the door mirror 1 of the embodiment 2.

As described above, when folding down the door mirror 1 in parallel to the side face of the vehicle's body, the divided mirror surface is driven to project outward. Accordingly, what is behind the vehicle's body is visible on the divided mirror surface, and the driver can make sure of the safety behind the vehicle's body even when a driver must drive a vehicle with its door mirrors folded down, for example, when two vehicles pass each other on a narrow road or when a vehicle is moved into a small garage.

Embodiment 4

In the door mirror 1 in accordance with embodiment 4, the reflection angles of the divided mirror surfaces 4a, 4b can be adjusted by reflection angle adjusting mechanisms 2, 3 and the casing 1c is also divided into an outer part 31 and an inner part 32, as shown in FIG. 13. The divided mirror surface 4b on the outer side is constituted to turn toward the outside face of the door mirror 1 integrally with the divided part 31 of the casing 1c.

In other words, in the door mirror 1 in accordance with the embodiment 4, the outer-side divided part 31 of the casing 1c can be turned separately from the inner-side divided part 32. Specifically, the divided part 31 is pivotally supported to be rotatable around the shaft 34, by a shaft 34 erected on a base 33 extended from the inner-side divided part 32.

A power transmission belt 24 is wound around the shaft 34 and the rotating shaft 19 of the door mirror 1. The power transmission belt 24 is provided with an idler 25 so as to adjust the tension of the belt to reliably perform the power transmission.

In this case of embodiment 4, whenever the divided mirror surface 4b on the outer side is turned, it is being accommodated in the casing 31 of the door mirror 1, so that it can be protected from rainwater or the like.

Figure 14:
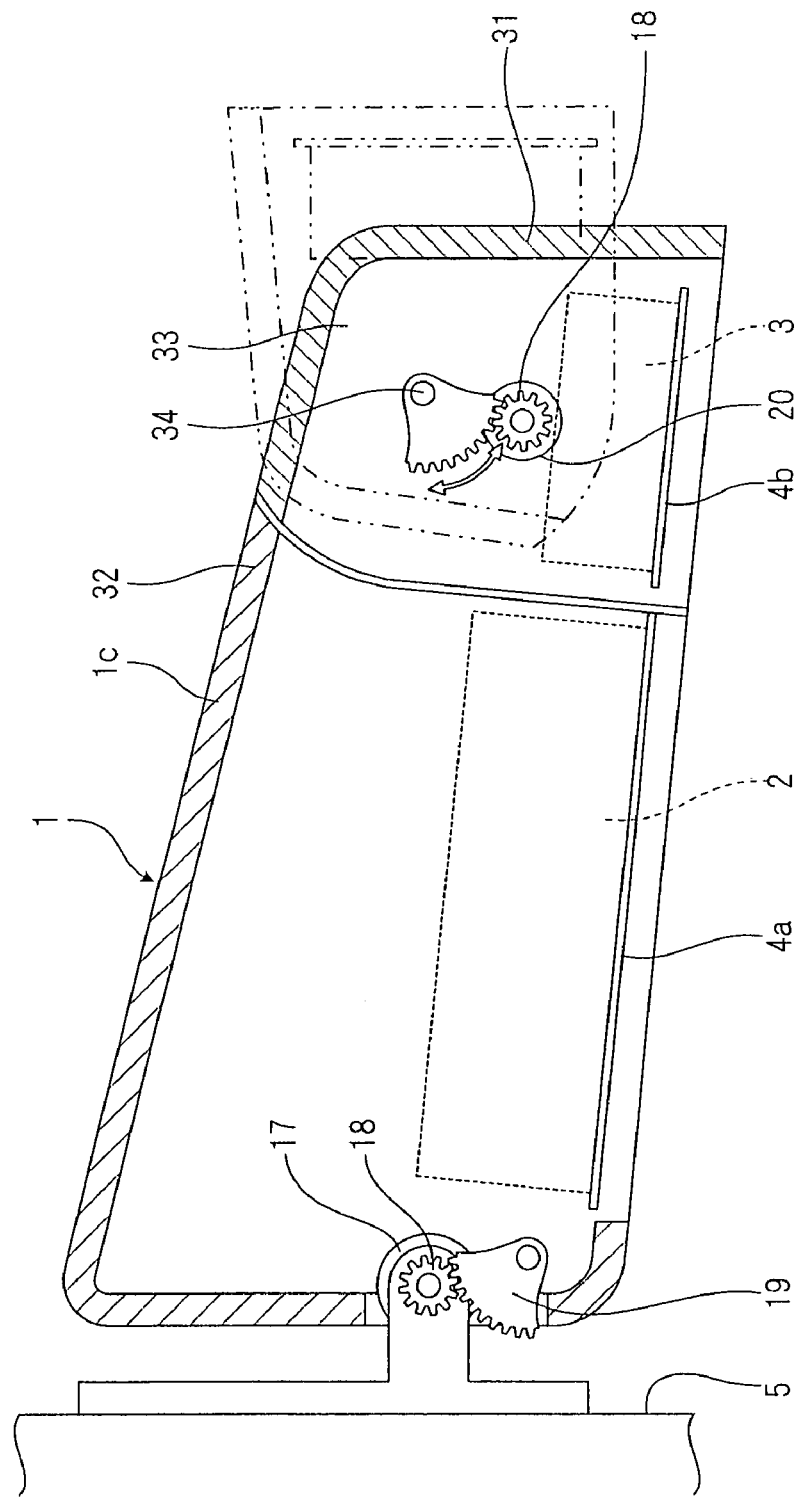
FIG. 14 is a perspective view of the door mirror in accordance with embodiment 4, showing another structural example.
Figure 15:
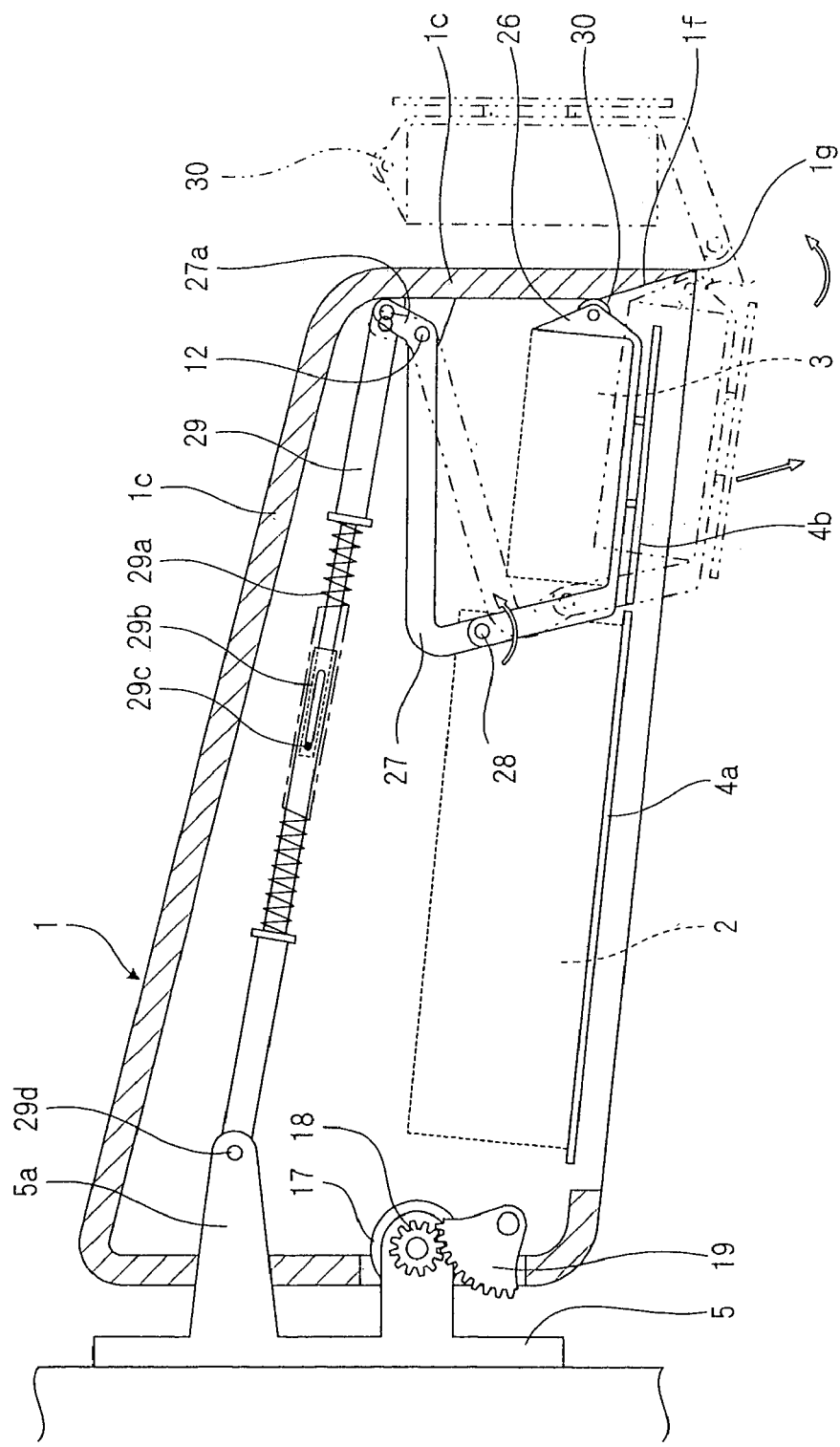
FIG. 15 is a sectional view of a door mirror in accordance with embodiment 5.

In the door mirror 1 of this embodiment, too, the turning motion of the divided part 31 may be performed by an independent driving motor 20, as shown in FIG. 14. Since the door mirror 1 shown in FIG. 14 is the same as that of FIG. 13 except that none of the power transmission belt 24 and the pulleys 22, 23 are used, the same parts are denoted with the same reference numerals and the detailed description will be omitted.

Although there is no illustration, the shaft 34 may be rotationally driven by a rod and a crank which are connected to the vehicle's body.

Embodiment 5

In the door mirror 1 in accordance with embodiment 5, the reflection angles of the divided mirror surfaces 4a, 4b can be adjusted by reflection angle adjusting mechanisms 2, 3 having the same structure as those shown in the embodiment 1, and the divided mirror surface 4b on the outer side can be turned finally to project laterally outward of the outer lateral face 1a of the door mirror 1.

In other words, the divided mirror surface 4b of the door mirror 1 in accordance with the embodiment 5 is attached to a base frame 26 together with the reflection angle adjusting mechanism 3. The base frame 26 is connected with a tip end of an arm 27 pivotally supported by the shaft 12. The base frame 26 is rotationally urged in a direction shown by an arrow, by a power spring (not shown) incorporated in a pivot 28 at the connecting portion so as to be elastically sandwiched between the tip end of the arm 27 and the inside face of the casing 1c.

A roller 30 is provided on the end face of the base frame 26 which is in contact with the inside face of the casing 1c.

A slope 1f is provided on the inside face of the casing 1c, which is inclined from the inside of the casing outward toward the casing opening, and with the turning motion of the arm 27, the base frame 26 starts parallel translation as shown by chain double-dotted lines.

Connected to an opposite end portion 27a of the arm 27, which is on the inner side of the shaft 12, is an expansion rod 29 urged by a spring 29a to be contracted toward the shaft 12. A stopper pin 29c provided on the outside surface of the expansion rod 29 is engaged with a slotted groove 29b formed in a cylinder outside of the expansion rod so that the expansion rod 29 cannot be expanded beyond a given length range.

The other end of the expansion rod 29 is attached to a rotating shaft 29d supported by a bearing 5a provided on the side face of the vehicle's body 5, so that the expansion rod 29 can be freely rotated around the rotating shaft 29d.

The operation of the door mirror in accordance with this embodiment 5 will be described.

When the door mirror 1 is driven by the driving motor 17 to turn in the direction in which it is folded down, the expansion rod 29 is gradually expanded, and with the increase in the shrinkage force of the spring, the opposite end portion 27a of the arm 27 is pulled, which generates a force to cause the arm 27 to turn around the shaft 12. As a result, the arm 27 starts turning in the direction to compress the base frame 26, as shown by chain double-dotted lines.

Thus, the base frame 26 is brought into a state in which the roller 30 is pressed against the inside face of the slope 1f which is inclined toward the opening of the casing 1c. As a result, the pressing force starts the base frame 26 to slide on the slope 1f and the rotationally urging force of the pivot 28 exerted in the direction shown by the arrow. Once the roller 30 goes beyond the opening end 1g, since the base frame 26 is urged at a portion of the shaft 28 connected with the arm 27 in such a manner as to be given a turning motion in the direction shown by the arrow, it is displaced to the outside of the case in a clicked manner, and finally it rests on the outside of the case in parallel therewith. Thus, the divided mirror surface 4b is positioned on the outside face of the door mirror 1 when the door mirror is in the folded state.

Figure 11:
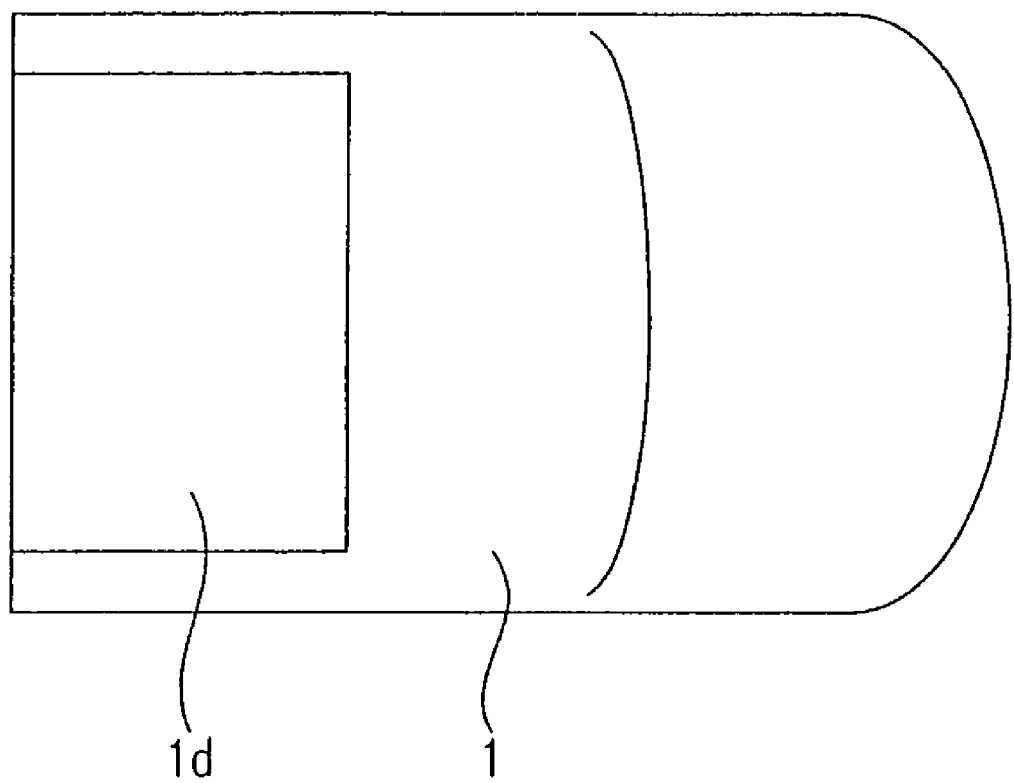
FIG. 11 is a side view of the door mirror in accordance with embodiment 3.

When the door mirror 1 is unfolded, the expansion rod 29 in the expanded state is contracted by the rotation of the driving motor 17 and the expansion and contraction of the expansion rod 29 is gradually restricted by the stopper pin 29b, and then, due to the force of the stopper pin 29b, the arm 27 starts turning in the direction of pulling the divided mirror surface 4b, gradually pulls the same into the casing 1c, and finally rests on the position shown in FIG. 11.

In the case of embodiment 5, too, the door mirror 1 may be constructed so that the shaft 12 can be independently remote-controlled by providing the same with a motor for driving the arm 27, or can be rotationally driven with a rod and a crank which are connected to the vehicle's body.

Embodiment 6

Figure 16:
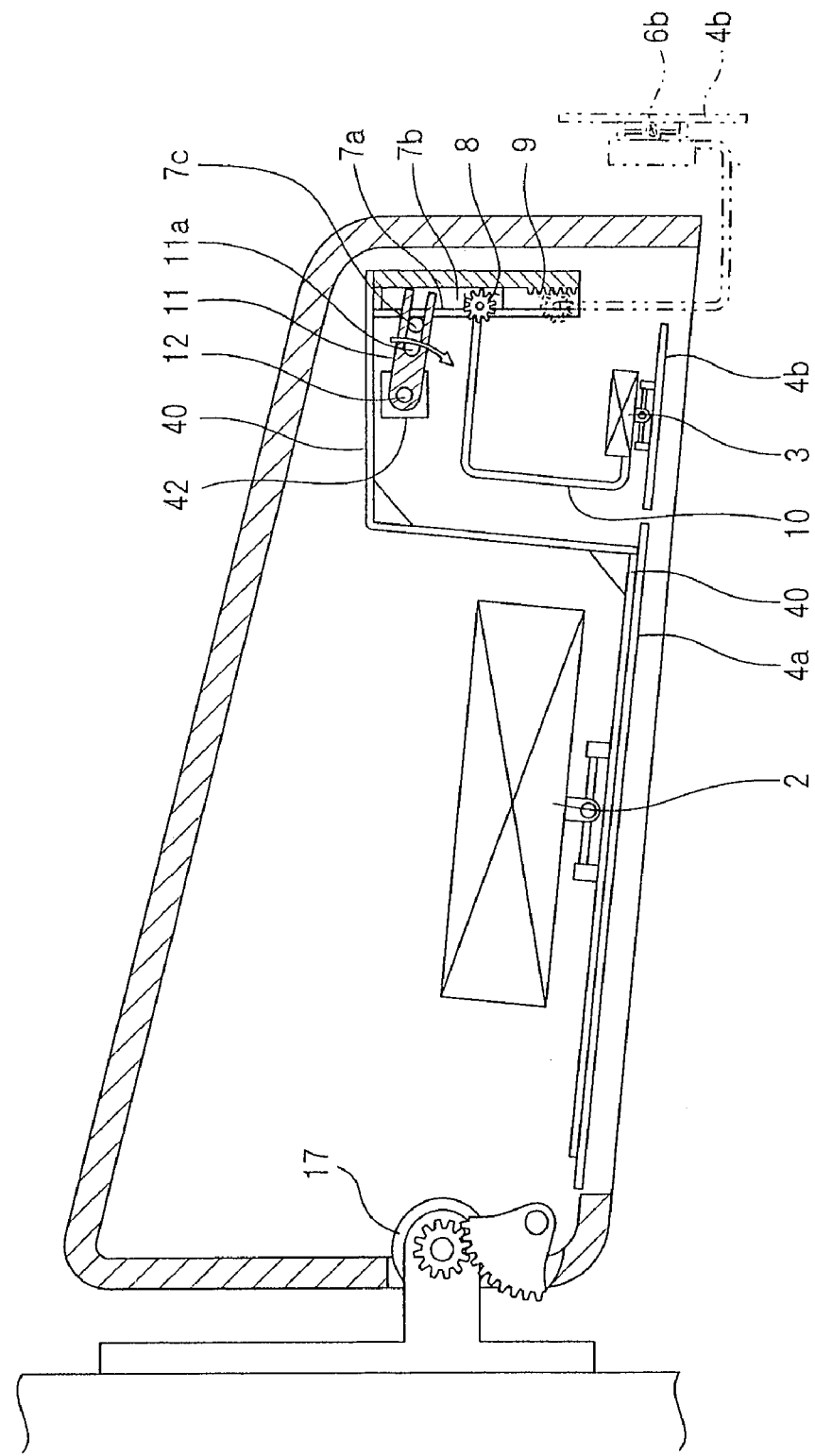
FIG. 16 is a sectional view of a door mirror in accordance with embodiment 6.

In the door mirror in accordance with embodiment 6, the mirror surface 4b on the outer side and the mirror surface 4a on the inner side are supported by a common base frame 40, and the reflection angles of both mirror surfaces 4a, 4b are made to be simultaneously adjustable by a first reflection angle adjusting mechanism 2 provided on the base frame 40, while the reflection angle of the outer mirror surface 4b is made adjustable by a second reflection angle adjusting mechanism 3 supported on the base frame 40, as shown in FIG. 16.

Accordingly, once the reflection angles of both mirror surfaces 4a, 4b are fixedly set, the reflection angles of both mirror surfaces are allowed to be simultaneously adjustable only by adjusting the first reflection angle adjusting mechanism 2.

Further, a mechanism for projecting the divided mirror surface 4b laterally from the door mirror 1 as shown in embodiment 2, can also be provided on the base frame 40.

Specifically, the driving force causing the divided mirror surface 4b to project laterally from the door mirror 1 is exerted by an electric motor 42, and a guide rail 7a and a slider 7b are provided on the base frame 40. Since these have the same structures as those of the embodiment 2 except that they are provided on the base frame 40, the same parts are denoted with the same reference numerals and the detailed description will be omitted.

In this case, after the door mirror 1 is unfolded, the reflection angles of both divided mirror surfaces are changed simultaneously by the first reflection angle adjusting mechanism 2. Therefore, once the relation between the reflection angles of both divided mirror surfaces is established, the reflection angles can be integrally changed while keeping the relation unchanged, facilitating the adjustment.

As described above, when the door mirror is folded down in parallel with the side surface of the vehicle's body, the divided mirror surface is projected outward, so that what is behind the vehicle's body is visible on the divided mirror surface. Thus, the driver can make sure of the safety behind the vehicle's body even when a driver must drive a vehicle with its door mirrors folded down, for example, when two vehicles pass each other on a narrow road or when a vehicle is moved into a small garage.

What is claimed is:

1. A door mirror comprising a mirror surface divided into right-hand and left-hand, outer-side and inner-side two mirror surfaces, the two divided mirror surfaces being provided with reflection angle adjusting mechanisms respectively for adjusting reflection angles of the two divided mirror surfaces independently from each other, the door mirror being allowed to be folded parallel to a vehicle's body or reversely unfolded therefrom, wherein:

the outer-side mirror surface of the two divided mirror surfaces is provided with a turning mechanism, and when the door mirror is turned in a direction of being folded, the outer-side mirror surface is caused to turn by the turning mechanism to such a position that what is behind the vehicle's body is reflected thereon, thereby enabling a driver of a vehicle incorporating the door mirror to observe what is behind the vehicle when the vehicle is driven backwards and the door mirror is folded down.

2. The door mirror according to claim 1, wherein the turning mechanism comprises a slider sliding along a guide rail, a pinion supported by the slider, a rack provided at an end of the slider and engaging with the pinion, and a turning arm mounted to a shaft of the pinion and projecting the outer-side mirror surface outward of the door minor.

3. The door mirror according to claim 2, wherein the slider is caused to slide by means of a rod having one end connected to the vehicle's body, a crank caused to turn by the rod, and a crank arm connected to the slider and caused to turn by the crank.

4. The door mirror according to claim 2, wherein the slider is caused to slide by means of a drive-side pulley, a driven-side pulley for turning a crank arm connected to the slider, and a power transmission belt wound around the pulleys.

5. The door mirror according to claim 2, wherein the slider is caused to slide by means of turning force of a driving motor.

6. The door mirror according to claim 5, wherein the inner-side mirror surface and the outer-side mirror surface are supported by a common base frame, and the common base frame has an reflection angle adjusting mechanism provided thereon.

7. The door mirror according claim 1, wherein the door mirror is attached to a curved arm, and when the curved arm is turned, the outer-side mirror surface is protruded outward of the outer side face of the door mirror.

8. The door mirror according to claim 7, wherein the outer-side mirror surface turns to project laterally outward of the outer side face of the door mirror from a casing thereof, together with an outer side face of the casing.

9. The door mirror according to claim 1, wherein the door mirror has a casing divided into an inner side part and an outer side part, and the outer-side mirror surface is constituted to turn toward the outer side face of the door mirror.

10. The door mirror according to claim 1, wherein the turning mechanism comprises a base frame provided thereon with the outer-side mirror surface, an arm attached to the base frame, and an expansion rod connected to a rear end of the arm, the arm having a tip end pivotally supported by a rotating shaft and pressing the base frame against an inside face of a casing elastically by a power spring, the expansion rod causing the arm to turn while the door mirror turns in the direction of being folded, thereby causing the base frame of the door mirror to protrude outward of the door mirror.

* * * * *